United States Patent [19]

Bachle

[11] Patent Number: 4,525,000
[45] Date of Patent: Jun. 25, 1985

[54] CABLE FITTING WITH VARIABLE INNER DIAMETER GROMMET ASSEMBLY

[75] Inventor: Walter W. Bachle, Harwinton, Conn.

[73] Assignee: General Signal Corporation, Stamford, Conn.

[21] Appl. No.: 581,145

[22] Filed: Feb. 17, 1984

[51] Int. Cl.³ .............................................. H02G 3/18
[52] U.S. Cl. ................................ 285/177; 174/65 SS; 285/161; 285/249
[58] Field of Search ................. 285/161, 177, 249, 12; 174/65 SS, 65 G, 153 G, 152 G; 277/198

[56] References Cited

U.S. PATENT DOCUMENTS

| 703,657 | 7/1902 | Horn | 285/177 |
|---|---|---|---|
| 1,488,175 | 3/1924 | Strandell | 285/249 X |
| 2,165,926 | 7/1939 | Greene | 285/177 X |
| 3,076,668 | 2/1963 | Famely . | |
| 3,754,557 | 8/1973 | Moore | 285/177 X |
| 3,833,754 | 9/1974 | Philibert | 285/161 X |
| 3,880,452 | 4/1975 | Fields | 285/177 |
| 4,030,741 | 6/1977 | Fidrych | 285/161 |
| 4,373,112 | 2/1983 | Mizuno . | |
| 4,480,860 | 11/1984 | Foresta et al. | 285/177 |

FOREIGN PATENT DOCUMENTS

| 336107 | 3/1959 | Switzerland | 285/177 |
|---|---|---|---|
| 390341 | 7/1965 | Switzerland | 174/65 SS |
| 396135 | 1/1966 | Switzerland . | |
| 437456 | 11/1967 | Switzerland | 174/65 SS |
| 451625 | 5/1968 | Switzerland | 285/177 |
| 451119 | 7/1936 | United Kingdom | 285/177 |
| 827134 | 2/1960 | United Kingdom . | |
| 2007791 | 5/1979 | United Kingdom | 285/177 |

OTHER PUBLICATIONS

Lapp Kabel, Stuttgart, FRG, 8 pages of Product Sheets.

Primary Examiner—Thomas F. Callaghan
Attorney, Agent, or Firm—Martin LuKacher

[57] ABSTRACT

A cable fitting which secures and provides strain relief for a cable passing therethrough is capable of use with a wide range of cable diameters. A grommet assembly disposed within the cable body and compressed by a nut has an insert which is removably disposed in the grommet of the grommet assembly and is in an interlocking relationship with the grommet so that the insert does not appreciably move axially with respect to the grommet.

14 Claims, 3 Drawing Figures

U.S. Patent   Jun. 25, 1985   4,525,000
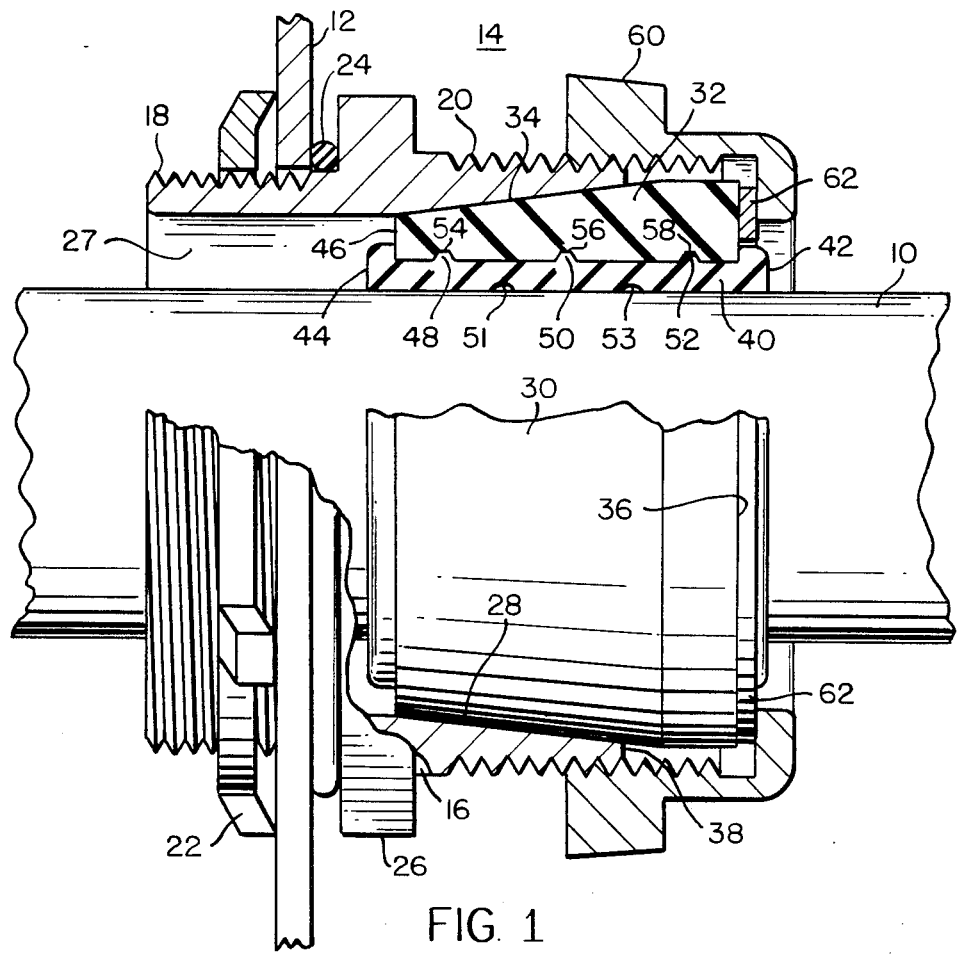
FIG. 1
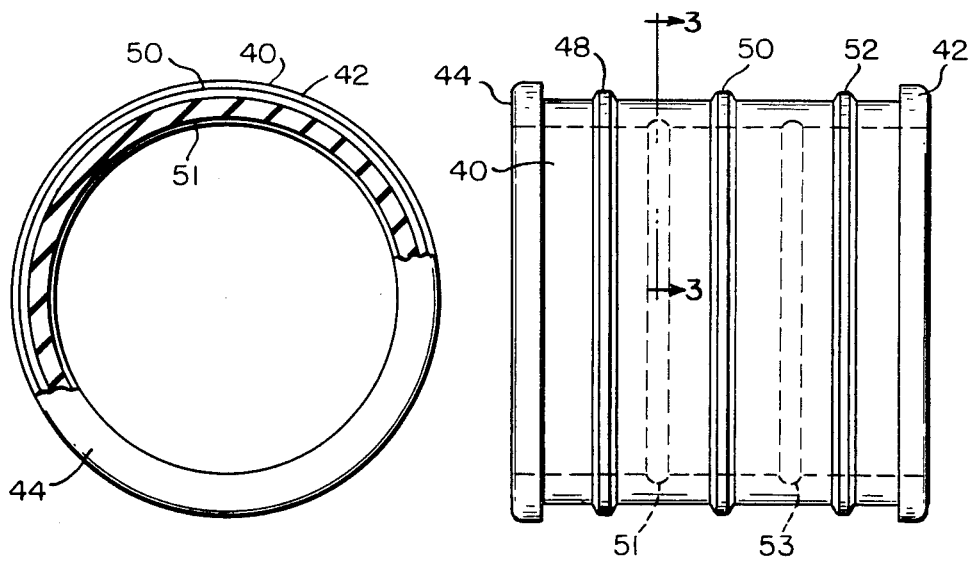
FIG. 2
FIG. 3

CABLE FITTING WITH VARIABLE INNER DIAMETER GROMMET ASSEMBLY

The present invention relates to cable fittings and particularly to fittings having grommets which seal, secure and provide strain relief for a cable which extends therethrough.

The invention is especially suitable for use in providing fittings for electrical cables (which term includes wires) which pass through the panels of electrical apparatus, such as junction boxes and like, to provide a seal which can be water, gas, and/or dust tight. The invention will also be found useful for securing cable of various cross-sectional shapes, e.g. oval, figure eight, etc., in an opening in any panel, wall, box, enclosure or the like.

Conventional cable fittings with seals have a one piece grommet disposed in the body of the fitting. This grommet is compressed by a nut to secure the cable. Cables come in various diameters and the range of diameters which can be secured by any given fitting is determined partly by the inside diameter of the grommet. Thus, the electrician or other workman must be supplied with a large number of grommets to cover a possible wide range of cable diameters to avoid delays in completing any installation or repair job. A solution, of course, is to supply two or more grommets with each fitting to extend the range of cable diameters with which it may be used; however, the provision of several grommets is impractical logistically. The possibility of losing the extra grommets dictates special packing. Losses and consequent delays are inevitable. The total installed cost of fittings with two or more grommets is also increased because of the additional time needed to disassemble and reassemble the fitting.

It has been suggested to use grommets with inserts. However, they have the propensity of falling out during shipment or pulling or popping out when the cable is pulled against the fitting. Then the cable is not securely held in the fitting and the seal, which is desirable in order to prevent moisture or gases from entering the apparatus through the cable opening, is broken. This is also very important because, if the strain relief function is lost the conductor termination can be excessively stressed and short circuiting—(to ground) can occur.

Accordingly, it is the principal object of the present invention to provide an improved cable fitting which is useful for securing and sealing cables over a large range of cable diameters.

It is a still further object of the present invention to provide an improved strain relief and sealing cable fitting having a variable inner diameter grommet assembly which enables the fitting to be used with cables which have a much larger range of diameters than would be the case with a grommet having a single inner diameter.

It is a still further object of the present invention to provide an improved cable fitting having a variable inside diameter grommet assembly with a removable insert which is securely assembled with the grommet and protected against axial movement, either pulling or popping, as when the cable is pulled against the fitting.

Briefly described, the cable fitting in accordance with the invention has an externally threaded tubular body through which the cable extends, a grommet assembly is located in the body and a nut is threaded on one end of the body. The nut also has an opening through which the cable extends. When the nut is tightened down on the body the grommet assembly is compressed to secure the cable within the fitting. The grommet assembly has a grommet and an insert removably disposed therein for reducing the inside cross-section or diameter of the grommet assembly. The grommet and the insert cover a range of cable cross sections or diameters larger than if the grommet is used alone. The insert and the grommet are disposed in interlocking relationship to prevent axial movement during compression or if the cable is pulled against the fitting, thereby preventing the insert from pulling or popping out of the grommet.

The foregoing and other objects, features and advantages of the invention and a presently preferred embodiment thereof will become more apparent from a reading of the following description in connection with the accompanying drawings in which:

FIG. 1 is an elevational view of a strain relief cable fitting embodying the invention installed on a panel and securing a cable passing therethrough, the view being partially broken away to illustrate the internal structure of the fitting;

FIG. 2 is an end view, broken away along line 3—3 in FIG. 3, to show internal construction of the insert shown in FIG. 3; and FIG. 3 is an elevational view of the insert of the grommet assembly used in the fitting shown in FIG. 1.

Referring to the drawing, there is shown a cable 10 which passes through a panel or other barrier 12. A strain relief cable fitting 14 secures and seals the cable and relieves strain therein, as when the cable is pulled against the fitting 14. The fitting has an externally threaded generally tubular body 16 with threads 18 and 20 on opposite ends thereof. A threaded, lock nut 22 on the threads 18 secures the fitting to the panel by compressing an O-ring 24 between the barrier and the fitting 14, and particularly a flange 26 on the body 16. The threads can, alternatively, be screwed into a corresponding (female) threaded hub to provide a watertight seal at the hub.

The body 16 has an opening 27 for the passage of the cable 10. A portion 28 of the opening 27 is generally tapered or conical in shape. A grommet assembly 30 is disposed in the opening in the body 16 and bears against the tapered portion 28. This grommet assembly 30 has a grommet 32 with an outside taper (an inwardly tapered or conical portion 34 on its outer periphery). This portion 34 bears upon the surface 28 of the housing 16. The grommet 32 has an outer end 36 which extends beyond the end 38 of the body adjacent thereto out of the body.

The grommet assembly 30 also has a removable insert 40, which is a tube having flanges 42 and 44 at opposite ends thereof. The flange 42 partially overlaps the outer end 36 of the grommet 32. The inner end 46 of the grommet 32 is partially overlapped by the flange 44. The insert 40 has a plurality (suitably 3 as shown) of annular ridges 48, 50 and 52 axially spaced on its outer periphery between the flanges 42 and 44. The ridges are annular and each ridge is trapezoidal in cross-section. The cross-sectional shape is not critical, and may be a semi-circle, for example. The flanges and ridges are disposed symetrically with respect to each other (so the insert does not have to be oriented for assembly). The end ridges 48 and 52 are closer to the flanges 42 and 44 than the distance between the ridges. With this spacing, the ridges restrict the insert from being squeezed out of the grommet when the grommet assembly 30 is compressed. The ridges 48, 50 and 52 extend into corresponding spaced annular grooves 54, 56 and 58 which are disposed in and around the inner periphery of the grommet 32. There are also annular grooves 51 and 53 around the inner periphery of the insert. The cable 10, after a period of time in engagement with the grommet assembly 30 will take a permanent set into the grooves 51 and 53 and form an interlocking geometry with the grommet assembly 30.

It is critical that the insert 40 and the grommet 32 be in interlocking relationship. This interlocking relationship is provided by the interlocking ridges 48, 50 and 52 and grooves 54, 56 and 58. The interlocking relationship is also provided by the flanges 42 and 44 which overlap the ends 36 and 46 of the grommet, other cross-section shapes and dispositions of the ridges and grooves may be provided so long as the interlocking relationship is preserved. This relationship prevents the pulling or popping out of the insert during shipment and when the assembly is compressed against the cable 10 by a nut 60 which is threaded on the threads 20 of the body 16. In order to facilitate turning the nut to compress the grommet assembly 30, preferably a washer of hard, low coefficient material (a disc-shaped ring) 62 is disposed between the end 36 of the grommet and the nut 60. The nut 60 bears against the washer 62 and compresses the grommet assembly, forcing the grommet 32 and insert 40 against the cable 10 to secure the cable in the fitting 14. The grommet assembly not only secures the cable but provides a water, dust and gas (air) tight seal. This is because the grommet 32 and the insert 40 are made of compressable elastomeric material such as natural rubber or an artificial rubber like neoprene a suitable durometer may be of the order of Shore A, 70/90.

The insert 40 is also shown in FIGS. 2 and 3 where the parts thereof are identified with reference numerals used in FIG. 1.

The grommet assembly 30 is supplied with the insert in place. In the event that the cable which is to be secured has a larger diameter than will pass through the inner diameter of the insert 40, the insert may be readily removed by collapsing the insert by exerting an inward radial force by hand or with the aid of an appropriate tool, such as a screwdriver. The insert may then be discarded. Of course insert may be provided disassembled from the grommet 32, however provision of the grommet assembly disassembled is not preferred due to logistic problems. Inserts are also quite inexpensive since they are fabricated, as by molding in the same manner as grommets and use much less material than a complete grommet which would have to be discarded if two grommets were provided with each fitting.

From the foregoing description it will be apparent that there has been provided an improved strain-relief cable fitting which affords a water, gas and dust tight seal. Variations and modifications in the herein described presently preferred embodiment of the fitting, within the scope of the invention, will undoubtedly suggest themselves to those skilled in the art. Accordingly, the foregoing description should be taken as illustrative and not in a limiting sense.

I claim:

1. A cable fitting having an externally threaded tubular body through which the cable extends, said body having an inside surface a portion of which is tapered in shape, a grommet assembly in said body, and a nut threaded on one end of said body also having an opening through which said cable extends for compressing said grommet assembly to secure the cable within the fitting, characterized in that said grommet assembly has a grommet with a conical outside surface which is tapered in a direction opposite to said tapered portion of said inside surface of said body so that said grommet is compressed both radially and axially by said nut, said grommet being of compressible elastomeric material with an insert also of compressible elastomeric material separate from said grommet and removably disposed therein for decreasing the inside cross section of said grommet assembly, whereby said grommet and said insert cover a range of cable cross sections larger than said grommet alone, said insert and said grommet being in such interlocking relationship as to limit axial movement of said insert during compressing of said grommet assembly and when said cable is pulled against the fittings, said interlocking being sufficient to prevent the insert from popping and pulling out of said grommet.

2. The cable fitting according to claim 1 wherein said interlocking relationship is provided by flanges of the ends of said insert in overlapping relationship with the opposite ends of said grommet.

3. The cable fitting according to claim 1 wherein said interlocking relationship is provided by a plurality of annular ridges spaced axially from each other and disposed around the outer periphery of said insert, a correspondingly spaced plurality of annular grooves around the inner periphery of said grommet, said ridges being disposed in said grooves.

4. The cable fitting according to claim 1 wherein said interlocking relationship is provided by flanges on the ends of said insert in overlapping relationship with the opposite ends of said grommet, and a plurality of annular ridges spaced axially from each other and disposed around the outer periphery of said insert, a correspondingly spaced plurality of annular grooves around the inner periphery of said grommet, said ridges being disposed in said grooves.

5. The cable fitting according to claim 1 wherein said interlocking relationship is provided by a plurality of annular ridges spaced axially of each other and a correspondingly spaced plurality of annular grooves, said grommet having said one of said plurality of ridges and grooves on the inner periphery thereof, said insert having the other of said pluralities of ridges and grooves on the outer periphery thereof, said ridges being disposed in said grooves.

6. The cable fitting according to claim 4 further comprising a washer of incompressible material between said nut and the end of said grommet facing said nut, said nut bearing on said washer.

7. The cable fitting according to claim 4 wherein the distance between said ridges is greater than the distance between said ridges and said flanges.

8. The cable fitting according to claim 5 wherein said insert has a plurality of annular grooves around the inner periphery thereof.

9. The cable fitting according to claim 8 wherein said grooves which are disposed around the inner periphery are spaced between said ridges.

10. The cable fitting according to claim 5 wherein said grooves and ridges are symetrically disposed so as not to require orientation during assembly.

11. A cable fitting having an externally threaded tubular body through which the cable extends, a grommet assembly in said body, and a nut threaded on one end of said body also having an opening through which said cable extends for compressing said grommet assembly to secure the cable within the fitting, characterized in that said grommet assembly has a grommet of compressible elastomeric material with an insert also of compressible elastomeric material removably disposed therein and in alignment therewith for decreasing the inside cross section of said grommet assembly, whereby said grommet and said insert cover a range of cable cross sections larger than said grommet alone, said insert and said grommet being in such interlocking aligned relationship as to limit axial movement of said insert during compressing of said grommet assembly and when the cable is pulled against the fitting sufficient to prevent the insert from popping and pulling out of said grommet, said interlocking relationship being provided by flanges on the ends of said insert in overlapping relationship with the opposite ends of said grommet, and a plurality of annular ridges spaced axially from each other and having predetermined spacings from said flanges and disposed around the outer periphery of said insert, a correspondingly spaced plurality of annular grooves around the inner periphery of said grommet, said ridges being disposed in said grooves and having said predetermined spacing from the ends of said grommet.

12. The cable fitting according to claim 11 further comprising a washer of incomprehensible material between said nut and the end of said grommet facing said nut, said nut bearing on said washer.

13. The cable fitting according to claim 11 wherein the distance between said ridges is greater than the distance between said ridges and said flanges.

14. The cable fitting according to claim 11 wherein said grooves and ridges are symmetrically disposed so as not to require orientation during assembly.

* * * * *